UNITED STATES PATENT OFFICE.

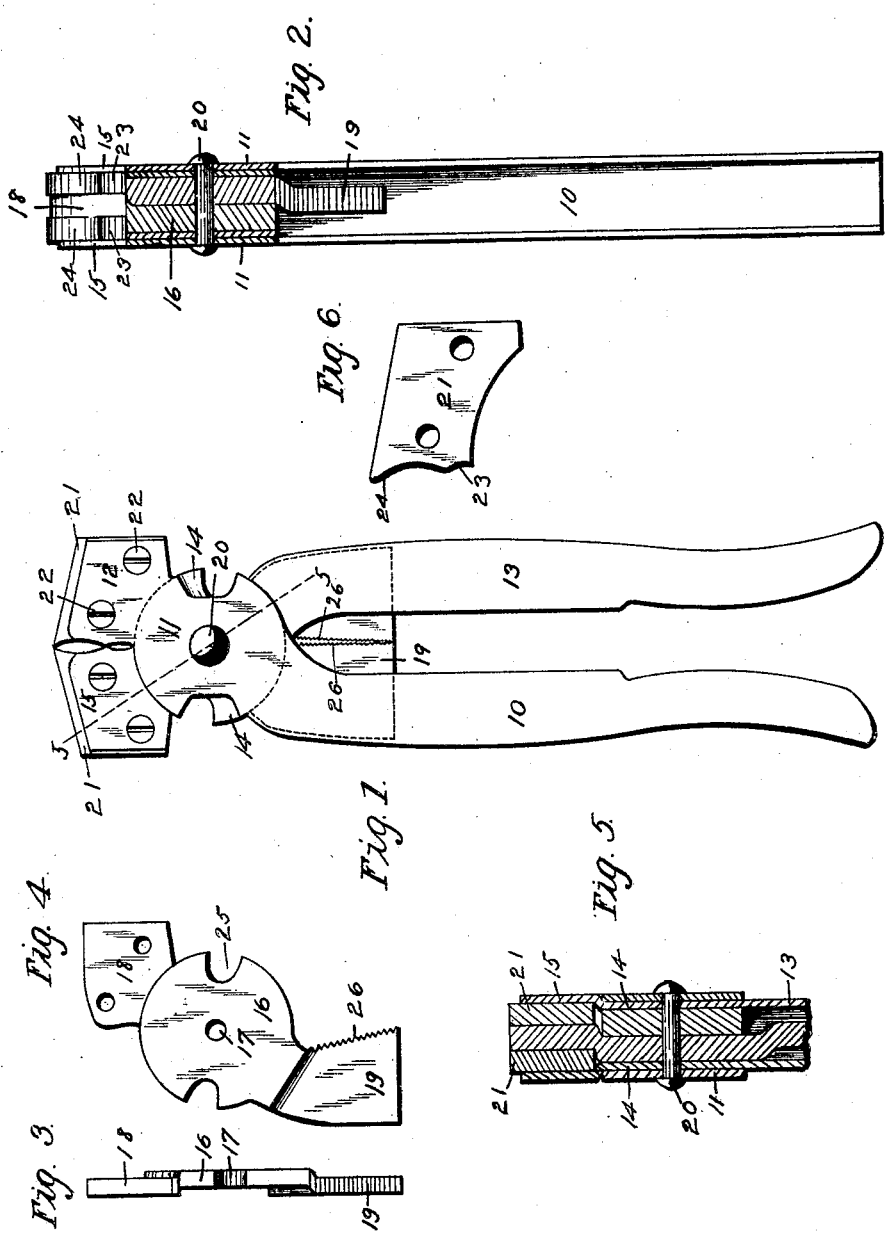

GILBERT M. MASON, OF PERRY, IOWA.

TOOL FOR CONSTRUCTING AND REPAIRING WIRE FENCES.

No. 890,152.   Specification of Letters Patent.   Patented June 9, 1908.

Application filed September 7, 1907. Serial No. 391,782.

*To all whom it may concern:*

Be it known that I, GILBERT M. MASON, a citizen of the United States, residing at Perry, in the county of Dallas and State of Iowa, have invented a certain new and useful Tool for Constructing and Repairing Wire Fences, of which the following is a specification.

The object of my invention is to provide a tool especially designed for use in building and repairing wire fences, and designed to drive nails or staples, to pull them, to straighten them, and to cut and twist wire.

More specifically, it is my object to provide a tool of this kind of simple, durable and inexpensive construction, that may be formed completely of pieces of sheet metal, and in which the corner pieces of each jaw may be quickly and easily detached and replaced when said parts are broken or worn, and further to provide a tool of this class in which said detachable corner pieces may be firmly held in clamp between the other members of the jaw, by means of two screws, thus forming substantially solid jaws, in which the corner pieces may be quickly and easily detached, without in any way interfering with the pivotal connection between the jaws.

My invention consists in certain details, in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of the complete tool embodying my invention. Fig. 2 shows a vertical, central sectional view of same. Fig. 3 shows an edge view of one of the central jaw members. Fig. 4 shows a side view of same. Fig. 5 shows a sectional view on the line 5—5 of Fig. 1, and Fig. 6 shows a side view of one of the corner pieces of the jaw.

Referring to the accompanying drawings, the tool is seen to be composed of two members pivotally connected, each member comprising a handle and a jaw. I shall first describe the outer sheet metal portions of the jaws which form the handles and the shell or casing of the jaw pieces. The first member is formed completely of a single piece of sheet metal, and comprises a handle portion 10, substantially U shaped in cross section, and having on each side a disk shaped side 11, with the pivot pin, hereinafter described, passed through their centers and a jaw member 12, being an extension of the disk shaped portion 11. The other member comprises a handle portion 13 similar to the part 10, two disk shaped portions 14 being extensions of the sides of the handle member 13, and two jaw portions 15 being extensions of the disk shaped portions 14. These jaw portions 15 are off-set from the parts 14, so that the outer faces thereof will be flush with the outer faces of the disk shaped portions 11, and also flush with the corresponding members 12 on the other jaw.

The body portions of the jaws are each counterparts, and each comprises a central disk shaped portion 16, with a pivot pin opening 17 therein, and a central jaw portion 18 off-set slightly from one side of the part 16, as clearly shown in Fig. 3, and also a handle portion 19 off-set from the disk shaped portion 16, to the same side as the part 18, as clearly shown in Fig. 3. Their lower ends extend into the handle portions 10 and 13 and fit against the outer walls thereof. These parts are assembled as shown in the drawings, and the pivot pin 20 is passed through the disk shaped portions 11, 14 and 16. These parts all lie flat against each other, and at the point where the pivot pin passes through the tool, the latter is of the same thickness as through the jaw members, as clearly shown in Figs. 2 and 5. The two jaw portions 18 stand directly in line with each other, on account of the off-set arrangement thereof from the disk shaped portions 16, hence, in each jaw there are two spaces between the jaw portions 18 and the jaw portions 12 or 15. These spaces are filled by means of the jaw members 21, which are of the shape shown in Fig. 6. The curved under portions of the jaws 21 are designed to fit over the disk shaped portions 11, 14 and 16, thus forming solid jaws, each jaw being composed of one jaw member 18, two jaw members 21 and two jaw members 12 or 15, as the case may be. I provide for connecting the jaw members of each jaw together by means of screws 22, two of which are passed through each jaw. The inner or working faces of the jaw members 21 are formed, near their inner portions with a curved notch 23, and at their outer portions with the projections 24, which projections are so arranged as to readily and quickly enter beneath a staple, as required in pulling staples. The notches 23 are useful in straightening nails or wire with the tool, in which case the nail or wire is placed between the jaws in said notches, and the jaws brought together. Formed in the disk shaped portions 16 are the wire cutting notches 25, of the ordinary kind. The lower ends of the handle members 19 are preferably notched on their inner faces at 26, to form jaws for gripping wire between them to be used in twisting the wires.

By means of the construction herein set forth, it is obvious that a fence tool of great strength and durability is provided, for the reason that the point on which the greatest strain falls in a tool of this kind, that is to say, the pivot point, is made firm and solid by means of the two disk shaped pieces 16, each having an off-set handle portion, and an off-set jaw portion, contained between the sides of the sheet metal handle portion and connected by a rivet. Furthermore, strong and durable jaw portions are provided, because in each jaw there is a central member 18, integral with the disk shaped portion 16, and there are also two sheet metal side portions 12, and in addition thereto there are two of the detachable jaw members 21, all held together by screws 22. The parts 18 and 12 of each jaw are so shaped that the detachable jaw members 21 are firmly supported between them. This assembling of the parts of each jaw in such a manner as to produce great strength and durability is made possible by the arrangement of off-setting the jaw members 18 from the parts 16, and also by forming the sheet metal body portions each with two jaw portions 12.

In a tool of this kind, strain is thrown upon the pointed ends 24 of the jaws, for in pulling staples, these pointed ends must enter the staple, and the entire strain of pulling staples is thrown upon these sharp points, hence they are liable to wear, even though made of the best material. In a jaw in which these points are formed integral with the body portion of the jaw, a breakage of any of said points would of course make the whole tool worthless. In my device, if such breakage should occur, it is only necessary to remove two screws 22, and then place a new jaw member 21 in position, and the tool is again ready for use, and is in as good condition as when first made.

Having thus described my invention, what I claim and desire to secure by Letters Patent of the United States, is—

1. A tool of the class described comprising two members, each formed of sheet metal and comprising a handle, two disk shaped portions integral with the handle, and two jaw portions integral with the disk shaped portions, a reinforcing piece for each member, each reinforcing piece comprising a central disk shaped portion, a jaw portion, and a handle extension, a pivot pin passed through all of said disk shaped portions, and means for connecting the jaw portions of each member with each other.

2. A tool of the class described comprising two tool members, each formed of sheet metal and comprising a handle portion substantially U shaped in cross section, having at one end two disks, and also having beyond the disks two jaw portions, a reinforcing piece for each member comprising a central disk shaped portion formed with wire cutting notches at its sides, an integral jaw extension and an integral handle extension, both of said extensions being off-set laterally in the same direction and said handle extension being inserted within the U shaped handle portion of the sheet metal members, and the jaw extensions being inserted between the jaw extensions of the sheet metal members, two detachable jaw members for each jaw inserted between the sheet metal jaw portions and the reinforcing jaw portion, means for connecting all of the jaw portions of each member, and a pivot pin extending through all of the disk shaped portions of both members.

3. A tool of the class described comprising two tool members, each formed of sheet metal and comprising a handle portion substantially U shaped in cross section, having at one end two disks, and also having beyond the disks two jaw portions, a reinforcing piece for each member comprising a central disk shaped portion formed with wire cutting notches at its sides, an integral jaw extension and an integral handle extension, both of said extensions being off-set laterally in the same direction, and said handle extension being inserted within the U shaped handle portions of the sheet metal members, and the jaw extension being inserted between the jaw extensions of the sheet metal members, two detachable jaw members for each jaw inserted between the sheet metal jaw portions and the reinforcing jaw portion, means for connecting all of the jaw portions of each member and a pivot pin extending through all of the disk shaped portions of both members, the handle extensions of the reinforcing members being provided on their inner edges with notches for use in twisting wire, said inner edges being so shaped as to come together when the jaw portions are together.

Des Moines, Iowa, Apr. 30, '07.

GILBERT M. MASON.

Witnesses:
S. F. CHRISTY,
RALPH ORWIG.